(No Model.)

A. WELLARD.
Carrousel.

No. 240,061. Patented April 12, 1881.

Witnesses
Chas. H. Smith
Harold Serrell.

Inventor
Andrew Wellard
for Lemuel W. Serrell
atty

UNITED STATES PATENT OFFICE.

ANDREW WELLARD, OF BROOKLYN, NEW YORK.

CARROUSEL.

SPECIFICATION forming part of Letters Patent No. 240,061, dated April 12, 1881.

Application filed August 12, 1880. (No model.)

*To all whom it may concern:*

Be it known that I, ANDREW WELLARD, of Brooklyn, in the county of Kings and State of New York, have invented a new and useful Improvement in Carrousels; and the following is declared to be a full and complete description of the same.

Carrousels (or "merry-go-rounds," as they are popularly termed) as at present constructed consist of a center pole or shaft carrying arms, from the ends of which are suspended horses or other animals of wood, or seats, upon which the persons riding are seated, the whole being driven or turned round by machinery.

My improved carrousel is composed of a center pole and a number of radial arms secured to it, and from the ends of said arms stay-ropes are carried up to the truck at the top of the pole. Upon said stay-ropes are sails, secured by the usual runners, and drawn up into place by ropes, as on a vessel, and also provided with sheets or ropes to connect the sail to said radial arms. Around the center pole, and of the proper diameter, is a circular tank, made to contain water, about fifteen inches deep, or sufficient to float small boats. To each arm is secured a boat by a suitable length of rope, and another rope is fastened to the inner side of the boat's stern and to the arm behind it. This rope prevents the centrifugal motion of the apparatus from displacing the boats. The wind acting against the sails revolves the apparatus similarly to a vertical windmill, and the arms draw the boats and their occupants round in the water-tank, and thus afford great amusement.

Figure 1:
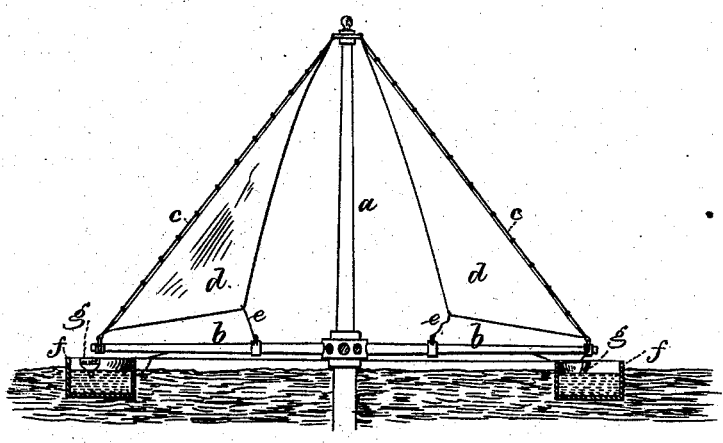
Figure 2:
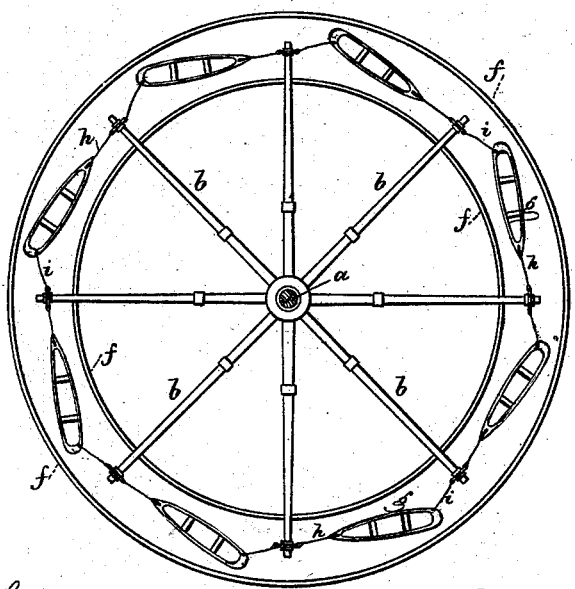

In the drawings, Figure 1 is a vertical section of my improved carrousel, and Fig. 2 is a plan of the same.

The center pole, *a*, is placed perpendicularly in the earth, and the radial arms *b* are at right angles to it, which arms are properly secured at the inner ends to a ring that surrounds the pole *a*, and from the other or outer ends there are stay-ropes *c*, which are secured in a truck at the top of the pole *a*. Upon said stay-ropes *c* are sails similar to a boat's jib-sail, and provided with the usual ring-runners, and the lower corners of the sails are held in place by sheet-ropes *e* to the arms *b*. These arms and sails revolve around the center pole, *a*. I construct a circular tank, *f*, around the pole *a*, of sufficient diameter to be under the ends of the arms *b* and of a depth to hold about fifteen inches of water, and said tank may be made of wood or metal. Small pleasure-boats *g* are floated in the tank, their bows being connected to the arms *b* by ropes *h*, and the sterns at one side being also connected by ropes *i* to the arms behind. The wind acts against the sails *d*, revolving the set of radial arms *b* around the center pole, *a*, said arms, in their turn, drawing the pleasure-boats *g* through the water in the circular tank *f*. The sails are set in any known or convenient manner, so as to revolve the arms and boats in one direction only.

If desired, the set of radial arms might be revolved by hand or other power to draw the boats around in the circular tank.

I am aware that a roundabout has been made for propelling boats in a circle in a pond or in an artificial basin. There is considerable danger attending the use of this device, because if a child falls out of the water toward the center of the basin there is no opportunity to reach it. In my apparatus the water-tank is ring-shaped, so that attendants are within the inner curb of the tank and spectators will be around the outer curb of the tank, and a child falling into the water can be easily reached, thus removing all risk of accidents; and by the use of sails the boats are propelled and the pleasing semblance of sailing is maintained. This is not the case where boats have before been used.

I claim as my invention—

1. A ring-shaped water-tank having external and internal circular curbs, in combination with a central pole, *a*, set of radial arms *b*, and boats *g* within the tank, for the purposes and as set forth.

2. In a carrousel, the combination of the center pole, *a*, set of radial arms *b*, sails *c*, water-tank *f*, and boats *g*, substantially as set forth.

Signed by me this 9th day of August, A. D. 1880.

ANDREW WELLARD.

Witnesses:
HAROLD SERRELL,
WILLIAM G. MOTT.